Dec. 24, 1940.   R. J. WEAVER   2,226,043
METHOD AND APPARATUS FOR TREATING WELD RODS
Filed Nov. 3, 1936   3 Sheets-Sheet 3
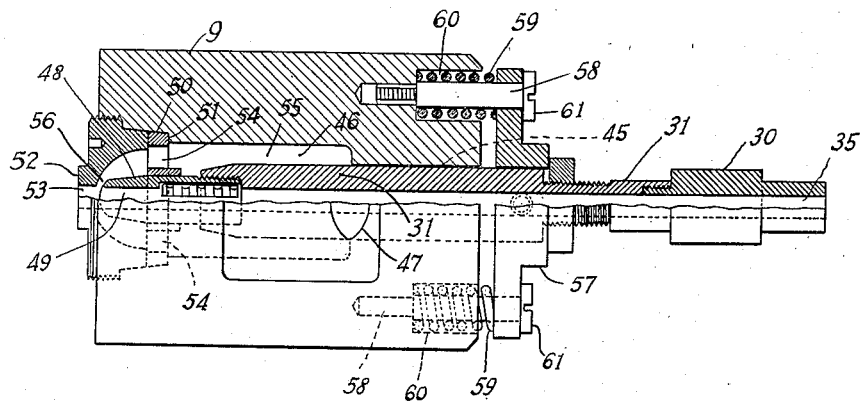
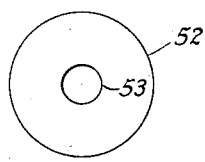
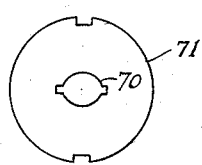
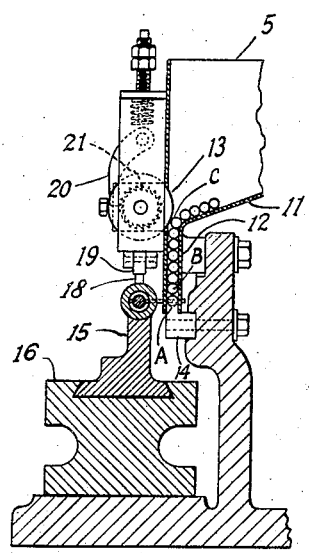
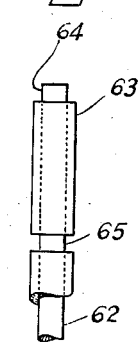
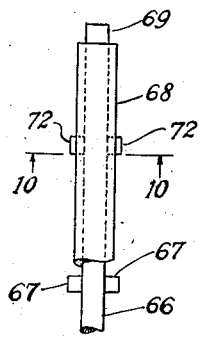
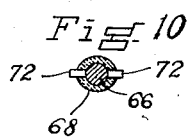
INVENTOR.
Ralph J. Weaver
BY
ATTORNEY.

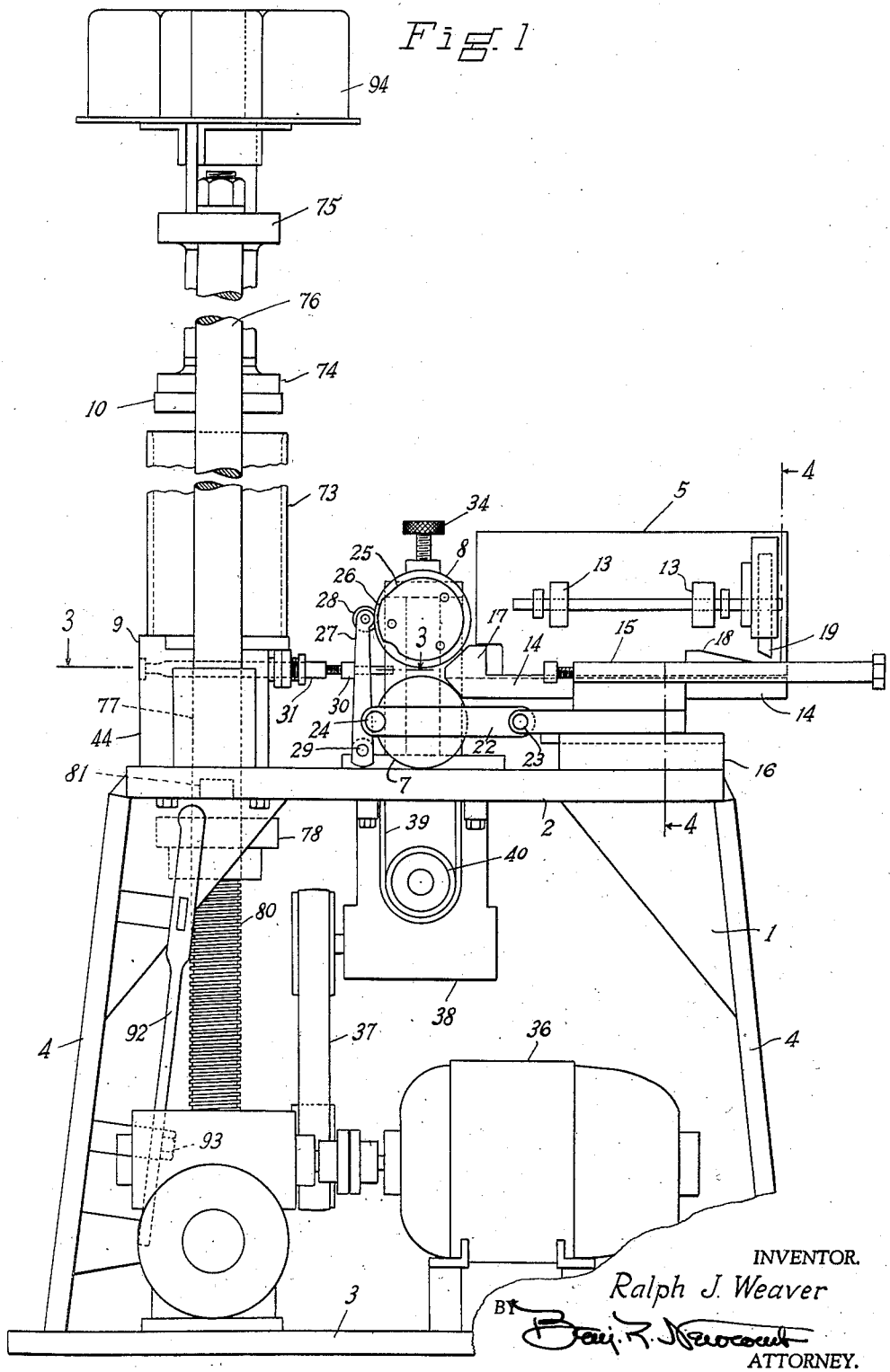

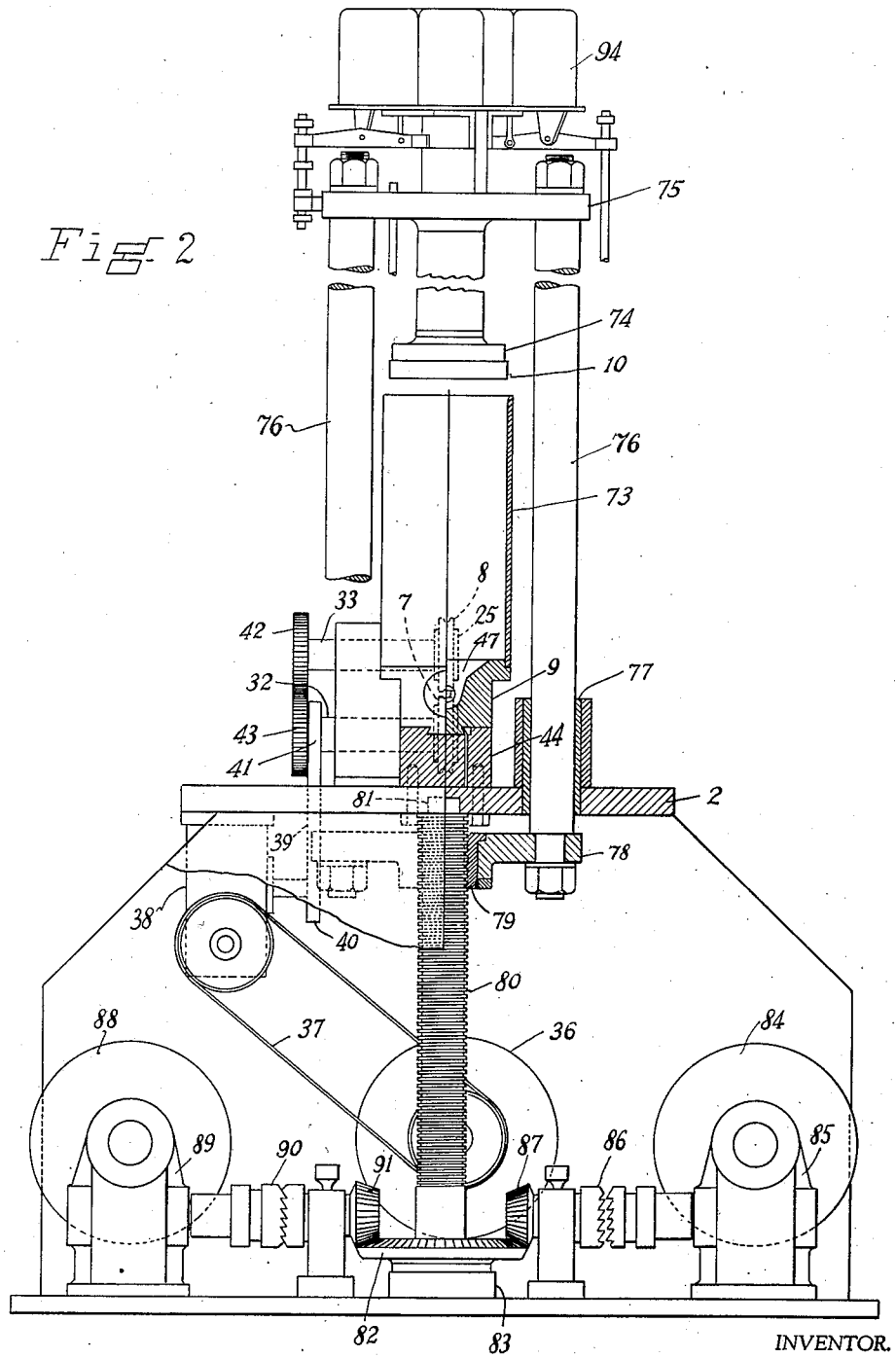

Patented Dec. 24, 1940

2,226,043

UNITED STATES PATENT OFFICE 2,226,043

METHOD AND APPARATUS FOR TREATING WELD RODS

Ralph J. Weaver, Cuyahoga Falls, Ohio, assignor to The Babcock & Wilcox Company, Newark, N. J., a corporation of New Jersey Application November 3, 1936, Serial No. 109,004

20 Claims. (Cl. 18—13)

My invention is an improvement in the manufacture of coated metallic rods particularly such rods as are coated with a material of fluxing characteristics, for example, which makes them useful in connection with fusion welding.

An object of the invention is the utilization of a coating material of such consistency and adhesive qualities as permit its application to the rod in a plastic condition by an extrusion process. Materials which are suitable for the purpose are fully described in the United States Patent 1,979,264 to J. C. Hodge et al., both as to their fluxing properties and their adaptability to the coating of the weld rod by extrusion.

Another object of the invention involves the interruption of the coating at a particular location on the rod to facilitate making electrical contact with the rod metal as required for use in electric arc welding processes, or as is often desirable, at spaced locations along the rod for use in connection with certain forms of electric arc welding machines.

A further object is in the automatic selection of the locations at which the coating is to be interrupted and the control of weld rod surface which is left exposed.

An additional feature is the development of apparatus by which the desired uniformity of product will be secured and whereby the foregoing processes and operations can be performed in a continuous manner for treating successive lengths of weld rod, which will include the treatment of a plurality of individual rods, or successive lineal portions of the same rod or wire; and rods of different cross-section, some of which may be of circular and others of non-circular or irregular contour in cross-section.

A complete understanding of my invention, its objects and advantages, may be had from the ensuing description and from the accompanying drawings, in which:

Fig. 1 is a side elevational view of apparatus incorporating various elements of the invention;

Fig. 2 is a front elevation of the machine shown in Fig. 1, portions being broken away to illustrate details;

Fig. 3 shows the die and die holder assembly, one half being in section along line 3—3 of Fig. 1;

Fig. 4 is a section through the feeder and hopper, taken along line 4—4 of Fig. 1;

Fig. 5 is a diagrammatic illustration of one of the dies for use with rods of circular cross-section;

Figs. 6 and 7 are side and sectional views respectively of a round rod to which an interrupted coating has been applied;

Fig. 8 is a diagrammatic illustration of a die for use with a rod having projections on its surface;

Figs. 9 and 10 are side and sectional views respectively showing a coating applied to a rod having projections.

The general arrangement of apparatus includes a substantially constructed supporting frame 1 comprising a top plate or table 2, a bottom plate 3 and intermediate side members 4. A hopper 5 is mounted at one end of the table and from this hopper individual lengths of bare weld rod are delivered by a suitable feeder mechanism, as hereinafter described, to the adjacent feed rolls 7 and 8, from whence they are fed through the die block 9 at the opposite end of the table. The ram 10 is mounted directly above the die block for forcing a plastic composition into contact with the rods to be treated, as will be more fully explained as the description proceeds. The driving mechanism, including the necessary motors and power transmitting devices, is located beneath the table 2.

The rods under treatment are, for example, individual lengths of bare weld rod metal, a number of such rods being indicated in Fig. 4 in hopper 5 prior to their release for delivery to the feed rolls 7 and 8. Hopper 5 is provided with a sloping bottom 11 along which the rods gravitate toward the vertically extending chute 12 into which additional rods are fed in succession by means of feed rolls 13 to replace the rods discharged from the chute. A feed bar 14 at the bottom end of the chute supports the lowermost rod until feeder 15 moves the rod endwise out of position and propels the rod into engagement with the continuously rotating lower and upper feed rolls 7 and 8 respectively. Feed bar 14 remains stationary with the hopper 5 whereas feeder 15 is reciprocated between guides on the feeder base 16 which is bolted or otherwise secured to the table 2. When the feeder is moved toward the left as seen in Fig. 1, it causes the lowermost rod A to be moved longitudinally along the feed bar 14 and through the end guide 17 into engagement with the feed rolls 7 and 8. With each movement of the feeder to the right, the attached fin 18 wedges the plunger 19 upwardly which, through the pawl 20 and ratchet 21, causes the rolls 13 to roll an additional rod C into the chute to replace the one previously removed from the bottom by means of feeder 15, the rod B moving into the lowermost position previously occupied by rod A.

The feeder 15 is actuated by a connecting rod 22 pivoted at one end to the feeder at 23 and at the other end to the crank pin 24 which rotates with the lower feed roll 7. The upper feed roll 8 is provided with a cam plate 25 having a cam crest 26 which actuates the arm 27 through cam roll 28 and causes oscillation of the arm about a stationary pivot 29. Arm 27 bears against the shouldered extension 30 on guide bar 31 of the extrusion device and produces the desired reciprocating movement of the guide for purposes which will be referred to later in more detail.

The feed rolls 7 and 8 are mounted on shafts 32 and 33, at least one of which, in this case the upper shaft 33, is resiliently supported against the adjusting screw 34 to maintain the desired gripping engagement between the rolls and the weld rod for feeding the rod into the central bore 35 of guide bar 31 which supports the weld rod during its travel through the die block 9. The feed rolls are driven from the adjustable speed motor 36 which operates through belt 37 and a speed reducer 38 to drive a chain belt 39 connecting the speed reducer gear 40 with pinion 41 attached to the lower feed roll shaft 32, the upper shaft 33 being rotated by the attached gear 42 meshing with gear 43 on the lower shaft.

The die block 9, which is mounted directly below the ram 10 on base block 44, is provided with a longitudinal bore 45 for slidably supporting the guide bar 31, and is formed with an internal chamber 46 and wall opening 47 for receiving the plastic coating material under pressure from ram 10. The upper surface of the block converges toward the opening 47 to promote an easy flow of the material into the opening and chamber. The back die 48, having the required form of central opening 49, and fitted with means for frictional engagement with the weld rod, is screwed into the end of the movable guide 31 and is slidably supported in the back die guide 50 which is seated in the shouldered recess 51. The front die 52 is screwed into the die-block against the back die guide 50 and closes that end of the chamber 46 except for the die opening 53 through which the coated rod is discharged, the distance between the movable die 48 and the stationary die 52 being varied, during operation of the device, from a maximum when the movable die is at its extreme right hand position to a minimum when the dies are substantially in contact. A plurality of openings 54 in the back die guide 50 permits a flow of plastic material from the space 55 at the rear of the chamber 46 to the space 56 between the dies. A cap 57, secured to the guide 31 and spaced from the end of die block 9 slides on shoulder bolts 58 which are screwed into the block, while compression springs 59 received in recesses 60 bear against the cap and thereby tend to force the cap against the bolt heads 61 to hold the extension 30 in engagement with the arm 27 to maintain the normally spaced relation between the dies 48 and 52. With the dies separated, and with plastic material under pressure in the chamber 46, there will be a coating applied to that portion of the rod lying between the dies. As the cam plate 25 is rotated, arm 27 periodically moves the back die 48 into substantial contact with the front die 52 to positively shield the rod from exposure to the plastic material and so cause an interruption of the coating for a predetermined distance along the rod.

Fig. 5 indicates a front die 52 in diagrammatic form, for use with rods of circular cross section, the central opening 53 being greater than the diameter of the bare rod by an amount determined by the thickness of coating desired. The corresponding opening 49 in back die 48 is made circular but of smaller dimensions and only slightly greater than the diameter of the bare rod. The finished rod is shown in Figs. 6 and 7 where the bare rod 62 is provided with the coating 63 which is interrupted at 64 to leave a bare contact zone at the end of the rod for making electrical connection with the rod, particularly when used with a manually operated electrode holder. A bare contact area is also shown at an intermediate location 65 which is representative of an interruption or interruptions which may be made at spaced intervals along the rod as may be required when the weld rod is to be used with automatic feeding and welding devices. It is to be understood that the bare spots at the end and at intermediate positions may be provided either singly or in combination and as many such interruptions made as may be desirable or necessary.

Fig. 8 diagrammatically indicates a form of die for use with a rod having projections on its surface, the central opening in the die, as shown, conforming generally to the cross-sectional configuration of the weld rod at the projections. Figs. 9 and 10 show such a rod 66 having laterally extending projections 67 and provided with a flux covering 68 throughout its length except for a bare zone 69 at the end, which is produced in the same manner and for a similar purpose as the contact area 64 for the plain rod. Intermediate contact zones on the rod 66 are provided by regulating the size and shape of the central opening 70 in front die 71 so that the projections 67 will extend through the coating, and if desired, protrude beyond the coating to leave the outermost ends 72 of the projections uncoated. The coating may also be interrupted, if desired, at locations intermediate the projections, in the same manner as described for contact zone 65 in connection with Fig. 6.

The ram cylinder 73 which contains the supply of plastic coating material and is supported on die block 9, is provided with a piston 74 for forcing the plastic material into contact with the lengths of weld rod as they pass through the die block. A bracket 75 at the upper end of the piston 74 is secured to the upper ends of guide bars 76 which extend through guide bearing 77 and top plate 2 for connection at their lower ends to a lower bracket 78. An internally threaded sleeve 79 carried by the lower bracket 78 engages the threads on feed screw 80 whose upper end has a bearing in the top plate 2 at 81. The lower end of the feed screw is supported by the bevel gear 82 which rotates in the step bearing 83 in base plate 3. The ram piston 74 is operated through the feed screw 80, guide bars 76 and the upper and lower brackets 75 and 78, the direction of movement either up or down being determined by the direction in which the feed screw is rotated.

Separately operable motors are shown for driving the pistons in the respective directions, the motor 84, for example, operating through speed reducer 85, clutch 86 and pinion 87 for downward movement, and motor 88 through reducer 89, clutch 90 and pinion 91 for upward movement. Preferably, these motors are of the adjustable speed type and the reducer 85 of greater ratio than reducer 89 in order to provide a relatively slow downward movement of the piston during the extrusion process, and a more rapid upward travel when it is desired to replenish the cylinder with additional coating material. The shift lever 92, pivoted at 93 on the frame 1, serves to disengage both clutches 86 and 90 so as to nterrupt the movement of piston 74, or to selectively operate one or the other of the clutches to drive the piston up or down as desired.

The device 94 shown above the ram bracket 75 is a limit switch, whose function is to automatically open the circuits of the respective motors 84 and 88 when the ram piston reaches its extreme lower or upper limit of travel. Such apparatus is well-known and the disclosure therefore is deemed sufficient for present purposes.

As already indicated, the rotation of the lower feed roll will operate the connecting rod 22 and thus cause reciprocation of the feeder 15 to periodically release the rods from hopper 5 and successively deliver them to the feed rolls 7 and 8. At the same time, rotation of the upper feed roll and the attached cam plate 25 causes the arm 27 to oscillate about the fixed pivot 29 and the guide 31 to be reciprocated. During the travel of a rod A, for example, between the feed rolls 7 and 8 the next rod B is automatically released from the hopper by feeder 15 and closely follows the first rod A through the feed rolls in order that there will be a substantially continuous length of weld rod being fed through the rolls and dies for coating purposes.

The feed rolls 7 and 8, of equal diameters, are driven at equal peripheral speeds by equal gears 42 and 43, so that for one revolution of the lower roll 7 there is a single revolution of the crank pin 24 on its circle of rotation and a single revolution of the cam plate 25. A half revolution of the crank pin from its extreme left-hand position as seen in Fig. 1 will cause the feeder 15 to be moved into its extreme right-hand position, so that during the next half revolution, the feeder will release a rod from the hopper 5 and deliver the rod to the feeding rolls for passing through the dies 48 and 52. It will be observed that for the extreme left-hand position of the feeder 15, cam plate 25 is positioned for maximum displacement of the arm 27, which through the extension 30 and guide bar 31 places the back die 48 at its extreme left-hand position and substantially in contact with the front die 52. As the cam crest 26 is rotated from the position shown, arm 27 moves to its position of minimum displacement so as to restore the normal spacing between the dies.

When the dies are in contact, the weld rod passing therethrough is shielded from contact with the plastic material and in consequence there can be no coating applied to the rod until the dies are again separated, and this interruption of the coating is repeated each time that the crest 26 engages the cam roll 28 and as many times for each length of weld rod as there are crests on the cam plate 25. In the particular form illustrated, only one crest is indicated and therefore this specific embodiment provides for a single interruption for each unit length of weld rod passing through the dies, either equal to or at least not exceeding, the perimeter of a feed roll 7 or 8. Thus, the number, length and position of the uncoated areas for any given length of weld rod, is directly related to the cycle of relative movement between the dies, and also involves the use of a cam of suitable formation with respect to the circumferences of the feed rolls.

The disclosure of the invention has been confined largely to the illustration and description of a single embodiment whereas numerous features are susceptible of more extended application. One instance, for example, is the feasibility of providing a plurality of crests on the cam plate 25 instead of the single crest 26 as shown, in order to provide a plurality of interruptions of the coating at spaced intervals for a given length of weld rod. Other modifications are also permissible without deviation from the spirit and scope of the invention and it is with such modifications and variations in view that the invention is defined in the appended claims which are therefore to be interpreted in their broadest sense without restriction or limitation except as required by existing patents or otherwise published prior art.

I claim:

1. The method of coating an elongated core which comprises moving the core longitudinally through and in contact with a mass of plastic material to form an adherent coating of said material on a portion thereof, and interrupting the application of said material to another portion while continuing the longitudinal movement of said core.

2. The method of treating a weld rod which comprises moving the weld rod longitudinally through and in contact with a mass of plastic material to form an adherent coating of said material on a portion thereof, and temporarily shielding another portion of said weld rod from contact with said material while continuing the longitudinal movement of said weld rod.

3. The method of treating a weld rod which comprises moving the weld rod longitudinally through and in contact with a mass of plastic material to form an adherent coating of said material on a portion thereof, and intermittently shielding other portions of said weld rod from contact with said material while continuing the longitudinal movement of said weld rod.

4. The method of coating the surface of an elongated core with plastic material extruded through a die which comprises feeding the core through the die, forcing said material in plastic form into contact with said core prior to the passage of said core through said die, and temporarily shielding a selected portion of the core surface from said plastic material, whereby a predetermined area of said core surface remains uncoated.

5. The method of operating an extruding device having normally spaced dies for applying a plastic coating to the surface of an elongated core which comprises feeding a length of said core successively through said dies, forcing a plastic material between the dies for contact with the core, and intermittently closing the space between the dies to prevent contact of the plastic material with the core to interrupt the continuity of said applied coating.

6. The method of operating a weld rod coating device having relatively movable dies for the sequential passage of the weld rod therethrough which comprises maintaining a normally spaced relation between said dies, feeding said weld rod through said dies, forcing a weld rod coating material in plastic form between said dies for contact with said weld rod surface, and producing relative movement of said dies to temporarily close the space therebetween whereby a predtermined portion of said weld rod surface is left uncoated.

7. The method of operating a weld rod coating device having dies normally spaced apart which comprises feeding a length of weld rod in sequence through a plurality of said dies, forcing a plastic composition into the space between the dies for contact with the weld rod, and periodically closing the space between the dies to prevent contact of the plastic composition with the weld rod whereby spaced areas of the weld rod surface remain uncoated.

8. A core coating machine comprising means successively feeding core lengths to be coated, an extruding device arranged to receive the lengths successively and for applying coating material to each length, means delivering coating material to said device, and means for selectively interrupting the application of the coating material for leaving an uncoated core length portion.

9. A rod coating machine comprising means successively feeding rods singly and in end to end relation, an extruding device arranged to receive the rods successively and for forcing a plastic material into contact with the rods during their passage through the device, and intermittently operative means shielding a portion of each rod from contact with said material whereby said rod portion remains uncoated.

10. A core coating device including a feeding mechanism for feeding an elongated core through the device, means for applying a coating of plastic material to said core, and means operated in coordination with said feeding mechanism for interrupting the application of said coating to a selected portion of said core length.

11. A weld rod coating device including means for feeding a length of weld rod therethrough, means for delivering a plastic material into contact with said weld rod and means operated in coordination with said weld rod feeding means for temporarily interrupting the application of said coating to a portion of the weld rod while continuing the feed of said weld rod through the device.

12. A weld rod coating device including a plurality of feed rolls resiliently contacting a length of weld rod therebetween, means for applying a coating of plastic material to said weld rod, and means operated in coordination with said feed rolls for interrupting the application of said coating to a selected portion of said weld rod.

13. In combination with an extrusion device having axially aligned spaced dies for sequential passage of a weld rod therethrough, means delivering a plastic coating material into contact with said weld rod intermediately of said dies, and simultaneously operating means for moving a length of weld rod through said dies and for temporarily preventing contact of said plastic material with a selected area of said weld rod surface.

14. In combination with an extrusion device having axially aligned spaced dies for sequential passage of a weld rod therethrough, means delivering a plastic coating material into contact with said weld rod intermediatey of said dies, and simultaneously operating means for moving a length of weld rod through said dies and for temporarily moving one of said dies into substantial contact with the other.

15. Weld rod coating apparatus including a plurality of normally spaced extrusion dies, means causing a length of weld rod to pass through said dies, means forcing a plastic material between the dies for contact with said weld rod, and means temporarily producing substantial closure of the space between the dies to prevent contact of said plastic material with a predetermined portion of the weld rod surface.

16. In an extruding press, an internally chambered member having an extension die fixed in relation thereto, a second die normally spaced from said extrusion die and reciprocably movable within the hollow interior of said member, each of said dies being provided with an opening for the passage of a rod therethrough, means delivering a plastic material under pressure into contact with a rod passing through the dies, and means for reciprocating said second die.

17. An extrusion press for the application of a plastic coating material to a weld rod including a member provided with an internal chamber for the reception of said material under pressure, a guide bar extending through a wall of said member, a die supported in an opposite wall, a die supported by said bar and reciprocable within said chamber, said guidebar and dies each having an opening axially aligned one with the other for the passage of said weld rod therethrough, and means reciprocating said dies relatively longitudinally of said openings.

18. A rod coating machine comprising means successively feeding rods to be coated, a coating device arranged to receive the rods successively for application of coating material thereto, means for delivering coating material to said device and to said rods, means intermittently operable for interrupting the application of said coating, and means for controlling the operation of the interrupting means for leaving an uncoated rod portion.

19. An extrusion press for the application of a plastic coating material to a weld rod including a member provided with an internal chamber for the reception of said material under pressure, a guidebar extending through a wall of said member and reciprocably supported therein, a die supported in an opposite wall, a die supported by said bar and reciprocable with said bar within said chamber, said guidebar and dies each having an opening therein for the passage of the weldrod therethrough, means reciprocating said guidebar axially of said openings and means associated with said guidebar for resiliently opposing said guidebar reciprocating means.

20. A core coating machine comprising means successively feeding core lengths to be coated, an extruding device including a die arranged to receive the lengths successively and for applying coating material to each length, means for delivering coating material to said extruding device and to said die, valving means for selectively interrupting the application of the coating material to said core length for leaving an uncoated core length portion, and means for periodically operating said valving means.

RALPH J. WEAVER.

CERTIFICATE OF CORRECTION.

Patent No. 2,226,043.　　　　　　　　　　　　　　　December 24, 1940.

RALPH J. WEAVER.

It is hereby certified that error appears in the printed specification of the above numbered patent requiring correction as follows: Page 2, first column, line 54, for the word "permits" read --permit--; page 4, second column, line 13, claim 16, for "extension" read --extrusion--; and that the said Letters Patent should be read with this correction therein that the same may conform to the record of the case in the Patent Office.

Signed and sealed this 18th day of February, A. D. 1941.

Henry Van Arsdale,
　　　　　　　　　　　　　　　　　　　Acting Commissioner of Patents.

(Seal)